No. 637,483. Patented Nov. 21, 1899.
E. T. PERRY.
NUT LOCK.
(Application filed July 28, 1899.)
(No Model.)
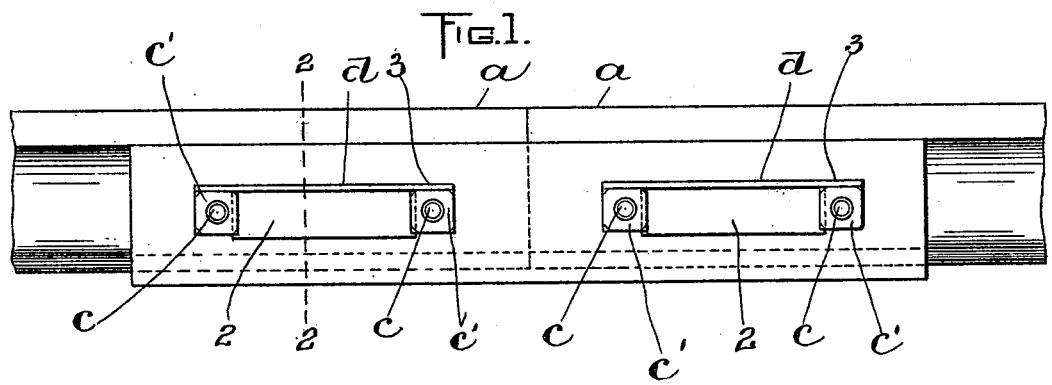
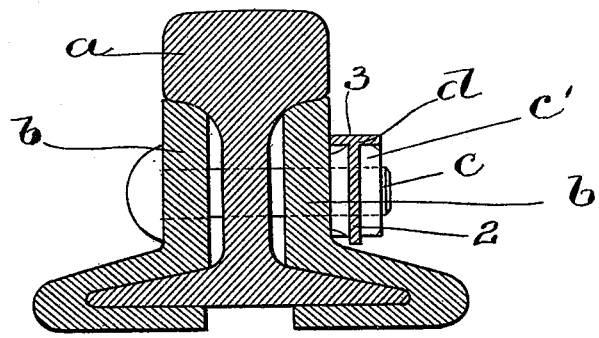
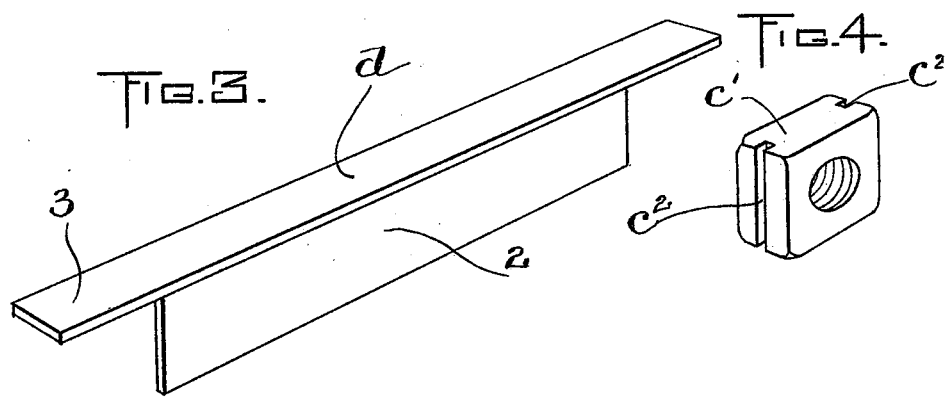
WITNESSES:
INVENTOR
E. T. Perry.

UNITED STATES PATENT OFFICE.

EVERETT T. PERRY, OF WILMINGTON, MASSACHUSETTS.

NUT-LOCK.

SPECIFICATION forming part of Letters Patent No. 637,483, dated November 21, 1899.

Application filed July 28, 1899. Serial No. 725,400. (No model.)

*To all whom it may concern:*

Be it known that I, EVERETT T. PERRY, of North Wilmington, in the county of Middlesex and State of Massachusetts, have invented certain new and useful Improvements in Nut-Locks, of which the following is a specification.

This invention relates particularly to that class of nut-locks adapted for use on the rail-joints of railroads; and it has for its object to provide a simple, secure, and cheap nut-lock for the purposes named and analogous purposes.

The invention consists in the novel features of construction and arrangement which I will now proceed to describe and claim.

Of the accompanying drawings, Figure 1 represents a side elevation of a rail-joint equipped with my improved nut-lock. Fig. 2 represents an enlarged section on the line 2 2 of Fig. 1. Figs. 3 and 4 represent, respectively, detail perspective views of the locking bar or plate and of one of the nuts.

The same reference characters indicate the same parts in all the figures.

Referring to the drawings, $a\ a$ designate two adjoining rail-sections, and $b$ designates a tie-plate or member, shown in the present instance as a single plate embracing the rails on either side thereof; but it will be understood that my invention is equally capable of being used in connection with separate tie-plates of the well-known form.

$c\ c$ designate the bolts passing through the rail and tie-plate, and $c'\ c'$ designate the nuts screwed on the ends of said bolts.

$d$ represents my improved locking plate or bar, the same being T-shaped in cross-section, the ends of its vertical portion 2 engaging grooves $c^2\ c^2$, which are formed on opposite sides of the nuts $c'$, approximately in the middle portion of said sides, while its horizontal portion or flange 3 overhangs the ends of the said vertical portion and rests on top of the nuts $c'\ c'$ when in position. The said horizontal portion or flange 3 also extends laterally into contact with the tie-plate $b$, and by closely abutting the latter serves to prevent the locking-plate $d$ from becoming displaced by jar or usage. The horizontal flange 3 is extended on both sides of the vertical portion 2 of the locking-plate, so that the said plate may be used with either side toward the tie-plate $b$. One locking-plate $d$ answers for two of the nuts $c'\ c'$, the said nuts being thereby locked in pairs, as shown.

The horizontal flange 3 may instead of being extended on both sides of the vertical part 2 of the nut-lock be extended on only one side of said portion, this construction being attained by omitting the projecting part of said flange 3 from one side of the nut-lock shown in the drawings, thus giving said nut-lock an L shape in cross-section.

I claim—

A device of the character specified, comprising the plate $b$, bolts $c\ c$, the nuts $c'\ c'$ grooved on their side faces, and a locking bar or plate $d$ consisting of a vertical portion having end edges adapted to simultaneously engage the groove in each of the two nuts and a horizontal portion having its ends projecting over and lying flatwise upon the top of the nuts, one edge of said horizontal portion closely abutting the outer face of the plate $b$.

In testimony whereof I have affixed my signature in presence of two witnesses.

EVERETT T. PERRY.

Witnesses:
CHESTER W. CLARK,
MARY MERCEDA GRANFIELD.